G. E. WALKER.
HARROW.
APPLICATION FILED MAR. 23, 1910.

983,523.

Patented Feb. 7, 1911.

3 SHEETS—SHEET 1.

Witnesses
Chas. L. Griesbauer.
E. M. Ricketts

Inventor
G. E. Walker,
By Watson E. Coleman.
Attorney

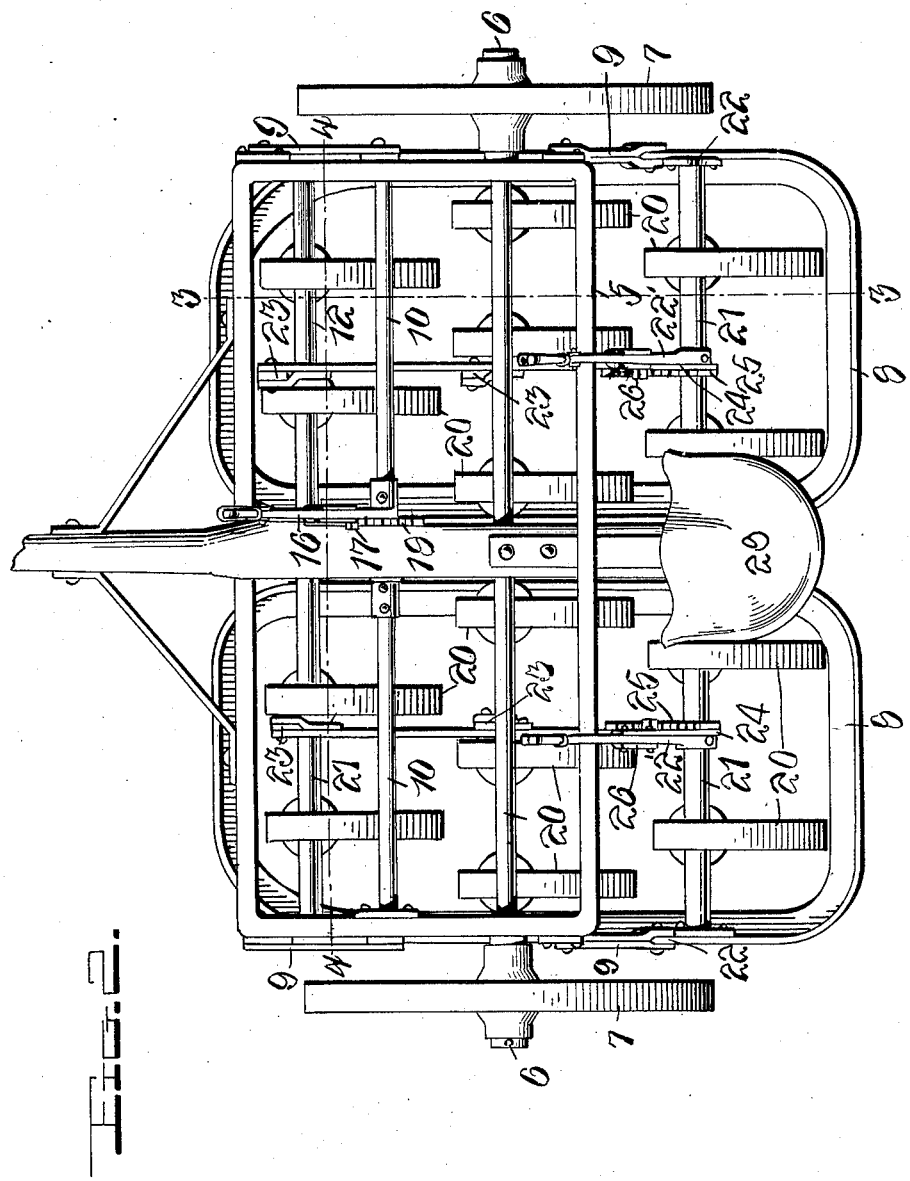

G. E. WALKER.
HARROW.
APPLICATION FILED MAR. 23, 1910.

983,523.

Patented Feb. 7, 1911.
3 SHEETS—SHEET 3.

Witnesses
Chas. L. Griesbauer.
E. M. Ricketts

Inventor
G. E. Walker,
By Watson E. Coleman,
Attorney

UNITED STATES PATENT OFFICE.

GEORGE E. WALKER, OF MASTEN, PENNSYLVANIA.

HARROW.

983,523.  Specification of Letters Patent.  Patented Feb. 7, 1911.

Application filed March 23, 1910. Serial No. 551,069.

*To all whom it may concern:*

Be it known that I, GEORGE E. WALKER, a citizen of the United States, residing at Masten, in the county of Lycoming and State of Pennsylvania, have invented certain new and useful Improvements in Harrows, of which the following is a specification, reference being had to the accompanying drawings.

This invention relates to certain new and useful improvements in sulky harrows and has for its object to provide a machine of this character wherein a plurality of harrow blades are adjustably arranged in a suitable carrying frame and new and novel means for adjusting said frames above the ground and means for independently adjusting the harrow teeth carried thereby.

Another object of the invention is to provide a comparatively simple machine of the above character comprising a wheel supported frame and independently adjustable harrow teeth carrying frames suspended therefrom, said suspended frames acting as drags to level the soil after it has been disturbed by the teeth.

With these and other objects in view, the invention consists of the novel construction, combination and arrangement of parts, hereinafter fully described and claimed, and illustrated in the accompanying drawings, in which:—

Figure 1:
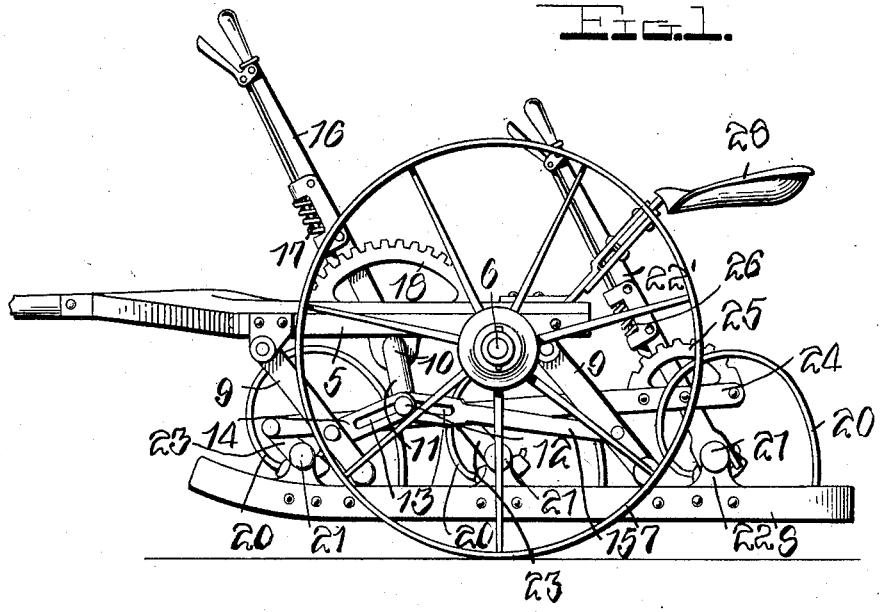
Figure 3:
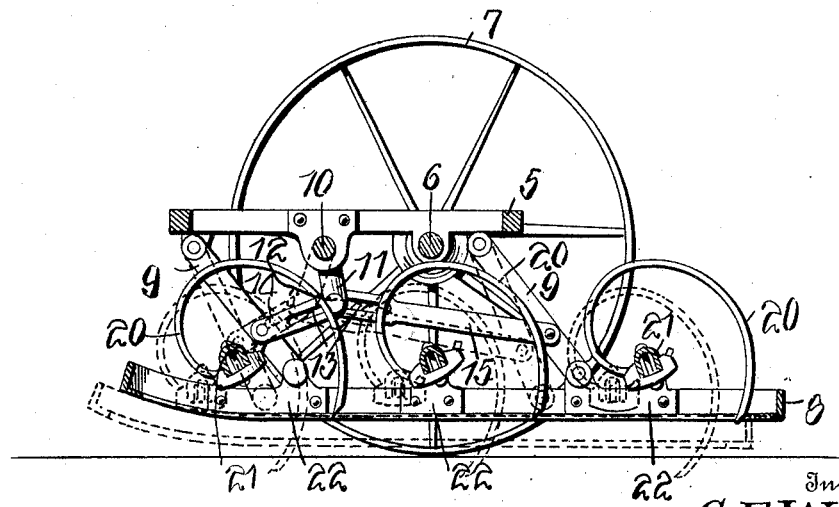
Figure 4:
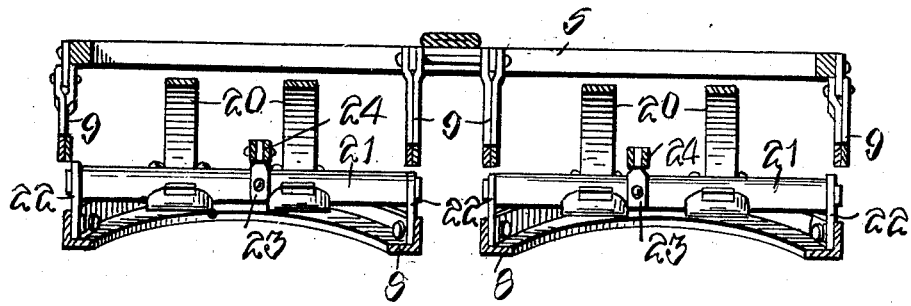
Figure 5:
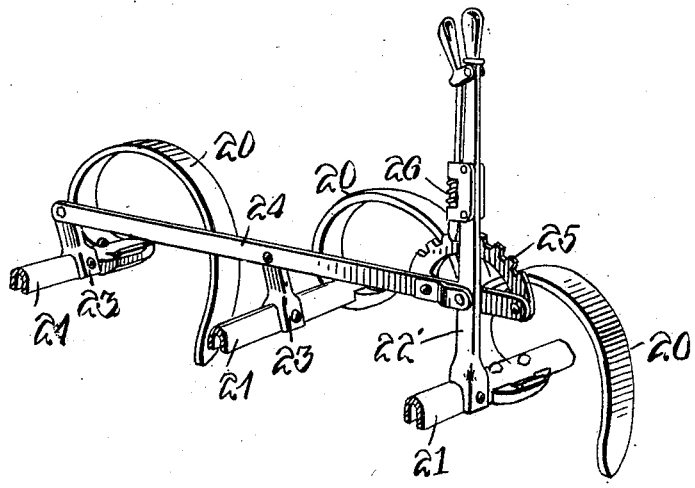

Figure 1 is a side elevation of a harrow constructed in accordance with my invention; Fig. 2 is a top plan view; Fig. 3 is a section taken on the line 3—3 of Fig. 2; and Fig. 4 is a section taken on the line 4—4 of Fig. 2. Fig. 5 is a detail fragmentary perspective view showing the means for adjusting the cultivator teeth.

Referring more particularly to the drawings 5 indicates the main wheel supported frame in which the ends of a wheel supporting axle 6 are secured, the traction wheels 7, being revolubly mounted on the ends of the axle. The usual draft appliances are of course employed and they may be arranged so that two or more draft animals may be applied.

A pair of tooth carrying frames 8, are arranged below the main frame 5 and are suspended therefrom by means of the link bars 9. These frames are formed from angle bars and are substantially rectangular in plan as clearly shown in Fig. 2. The link bars have their bearings pivotally secured to the main frame and to the longitudinal sides of the tooth carrying frames 8. A rock shaft 10 is mounted in the main frame 5 in advance of the wheel axle 6. A plurality of arms 11 are secured to this shaft and depend therefrom. A pin 12 is secured in the lower end of each of the arms and extends through the longitudinal slots 13 provided in the connecting links 14 and 15, respectively. The links 14 are considerably shorter than the links 15, and are pivotally connected to the forward suspending links 9, the slotted links 15, being similarly connected to the rear link bars 9. The teeth carrying frames may be raised and lowered above the ground surface. For this purpose a lever 16 is secured to the rock shaft 10, and carries the usual spring actuated dog 17, which engages with a rack segment 18.

In carrying out my invention either a flat spring tooth or a spiked tooth may be employed, the machine serving its function equally as well with any of the various forms of teeth usually employed. The harrow teeth 20, are secured at one end to a plurality of transversely extending shafts 21, which are mounted in the bearings 22 secured to the opposite sides of the suspended frames 8. The points of the harrow teeth are adapted to be raised and lowered so that they will enter the soil to any required depth. In order to adjust the teeth in this manner a lever 22' is secured to the rear shaft 21, mounted in each of the frames 8, and to each of the remaining shafts a vertical arm 23 is secured. These arms are connected to the lever 22', by means of a longitudinally extending bar 24, said bar being pivotally connected to each of the arms and to the lever. This bar also carries at one end a rack segment 25, which is adapted to be engaged by a spring pressed dog 26, carried by the lever 23, so that the teeth may be rigidly held at any point of their adjustment. A driver's seat 28, is arranged between the levers 22', whereby they are in easy reach of the driver so that they may be easily and quickly adjusted. The lever 16, is in advance of the driver's seat, but so disposed that he can easily reach forward and actuate the same.

From the foregoing it will be seen that when the lever 16, is drawn rearwardly, the harrow teeth carrying the frames will be lowered, the pin 12 moving in the slots of the angularly disposed links 14 and 15, and forcing the same in opposite directions or away from each other, this movement lowering the frames 8. These frames act as drags to smooth the ground surface after the harrow teeth have disturbed the same.

The arrangement of the elements above set forth provides a machine of comparatively simple construction and one which may be easily and quickly adjusted in order to adapt the machine for use upon ground of varying conditions.

It will be obvious that a single tooth carrying frame may be employed if desired and that a greater or less number of harrow teeth may be employed than is shown in the drawings.

Numerous other minor modifications may also be resorted to without departing from the spirit or sacrificing any of the advantages of the invention.

What is claimed is:—

1. In a sulky harrow, a wheel supported frame, a pair of harrow tooth carrying frames suspended from said wheeled frame, link bars connecting said tooth carrying frames to the wheeled frame, said suspended frames having longitudinal swinging movement, a rock shaft mounted in the wheeled frame, a lever to rock said shaft, links pivotally secured at one end to the frame supporting link bars, the other ends of said links being supported for relative movement, and arms secured to the rock shaft connecting the ends of said links whereby the actuation of said lever will swing the tooth carrying frame and raise or lower the teeth with relation to the ground.

2. In a sulky harrow, a wheel supported frame, a pair of harrow tooth carrying frames arranged beneath the wheeled frame, link bars connecting said tooth carrying frames and the wheeled frame, a rock shaft journaled in the wheeled frame, a plurality of arms depending from said rock shaft, links pivotally secured at one end to the frame supporting link bars, slot and pin connections between said links and the arms carried by the rock shaft, a manually actuated lever adapted to rock said shaft and raise and lower the tooth carrying frames above the ground surface, a plurality of harrow teeth carried by each of said frames, and means for simultaneously adjusting the teeth in each of the frames.

3. A sulky harrow comprising a wheeled frame, harrow tooth carrying frames arranged beneath the wheeled frame, link bars connecting the wheeled frame to the tooth carrying frames, a rock shaft journaled in the wheeled frame, movable connections between the rock shaft and said bars, an operating lever secured to the rock shaft to rock the same and raise and lower the tooth carrying frame, a plurality of transverse shafts journaled in each of the latter frames, an operating lever secured to one of said shafts, arms secured to the remaining shafts, a longitudinally extending bar pivotally connected to each of said arms and to the lever, a rack carried by said bar, and a spring pressed dog adapted to engage with the teeth of said rack to hold the shafts against rotation and secure the harrow teeth in their adjusted positions.

In testimony whereof I hereunto affix my signature in the presence of two witnesses.

GEORGE E. WALKER.

Witnesses:
 WALDO E. KILMER,
 JACOB Q. BROWN.